Figure 1:
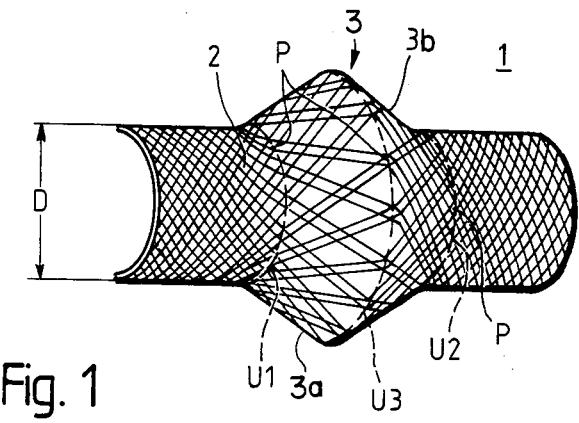

United States Patent [19]

Bongers et al.

[11] Patent Number: 4,577,736

[45] Date of Patent: Mar. 25, 1986

[54] TUBULAR MEMBER, ESPECIALLY FOR A SAFETY STEERING COLUMN FOR MOTOR VEHICLES

[75] Inventors: Bernd Bongers, Kirchheim; Horst Bansemir, Munich, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 612,139

[22] Filed: May 21, 1984

[30] Foreign Application Priority Data

Jun. 11, 1983 [DE] Fed. Rep. of Germany ....... 3321197

[51] Int. Cl.$^4$ ............................................. F16F 7/12
[52] U.S. Cl. ..................... 188/371; 74/492; 138/123; 138/DIG. 2; 280/777; 464/80; 464/88
[58] Field of Search ....................... 188/371, 376, 377; 267/148, 149, 139; 293/133, 136; 280/777; 74/492; 138/DIG. 2, DIG. 7, DIG. 11, 177, 123, 124, 172, 174, 178; 285/229; 464/80, 88, 181, 183

[56] References Cited

U.S. PATENT DOCUMENTS

| | | | |
|---|---|---|---|
| 3,373,630 | 3/1968 | Heurtebise | 188/371 X |
| 3,412,628 | 11/1968 | De Gain | 293/133 X |
| 4,304,147 | 12/1981 | Linnemeier et al. | 188/371 X |
| 4,336,868 | 6/1982 | Wilson et al. | 293/133 X |
| 4,465,301 | 8/1984 | Bongers et al. | 280/777 |

FOREIGN PATENT DOCUMENTS 3045141 6/1982 Fed. Rep. of Germany .
3229209 2/1984 Fed. Rep. of Germany .

OTHER PUBLICATIONS

Worksheet entitled "Elastische Eigenschaften Ausgeglichener Winkelverbunde in Abhaengigkeit Vom Faserorientierungswinkel, pp. 1 to 10, Nr. 22 300–05 by W. Weiss, Apr. 29, 1980.

Primary Examiner—Bruce H. Stoner, Jr.
Assistant Examiner—Robert J. Oberleitner
Attorney, Agent, or Firm—W. G. Fasse; D. H. Kane, Jr.

[57] ABSTRACT

The invention relates to a tubular member, especially for safety steering columns for motor vehicles, made of wound fiber-reinforced materials. The winding angle of the fibers or fiber belts amounts to essentially ±45° relative to the tube's longitudinal axis. For taking up high torsional moments and simultaneously low compressive and buckling or bending loads, the tubular member (1) has an expanded outwardly bulging section (3) extending around the entire circumference of the tubular member. This bulging section is preferably a double conical outward bulge. The fibers (2) cross each other at an angle of essentially 90° even in the region of the outwardly bulging section (3), which means that the winding angle of essentially ±45° to the tube's longitudinal axis is maintained in the region of the outwardly bulging section (3).

4 Claims, 2 Drawing Figures

TUBULAR MEMBER, ESPECIALLY FOR A SAFETY STEERING COLUMN FOR MOTOR VEHICLES

FIELD OF THE INVENTION

The invention relates to a tubular member, particularly for a safety steering column for motor vehicles. Such columns are made of fiber compound materials or fiber reinforced materials with a fiber winding angle of about ±45° relative to the longitudinal axis of the tubular member.

DESCRIPTION OF THE PRIOR ART

Such tubular members, generally in the form of cylindrical tubes, are used in the manufacture of motor vehicles for drive shafts, steering columns, etc. These tubular members are wound of fiber-reinforced materials with a fiber winding angle of essentially ±45° relative to the longitudinal axis of the tubular member. When these tubular members are subjected to torsional moments, the fibers are loaded or stressed in the direction in which they are oriented, that is, the stress is either a tension stress or a compression stress. The tubular members are wound either of single fibers or of flat fiber belts that are bonded to each other by a curable resin. Such tubular members can be constructed for optimal strength and rigidity relative to the torsion loads for given fiber and binding material characteristics.

In many fields of application, for example in the manufacture of drive shafts, for motor vehicles, or especially in connection with safety steering columns for motor vehicles, it is necessary to construct a torsion-loaded tubular member to be able to buckle or bend easily as a whole or at discreet points along its length, because the rotational axes of the input and output torques vary their positions relative to each other.

In connection with safety steering columns it is additionally imperative that the chances of injuries to the vehicle occupants are made unlikely or at least reduced as much as possible in case of a driving impact accident. Therefore, it is further required that despite the torsional rigidity, the steering column must be elastic in its longitudinal direction and/or it must buckle or otherwise be destroyed by a load effective in its longitudinal direction and such axial load should be as low as possible for minimizing injuries.

Such a safety steering column is known from German Patent Publication DE-OS No. 3,045,141, corresponding to U.S. Pat. No. 4,465,301, issued Aug. 14, 1984. At least a portion of this known safety steering column is constructed as a fiber mesh tube which is wound of fiber strand belts. The winding angle of the fiber strand belts in this case is essentially ±45°. The requirements for rigidity or stiffness of this known safety steering column may be varied within a wide range, for example, by the number of fiber strand layers in the individual web strands, or by the selection of the width of the wound fiber belts as well as by varying the winding angle.

OBJECTS OF THE INVENTION

In view of the above it is the aim of the invention to achieve the following objects singly or in combination:

to improve a tubular member such as a steering column, especially a safety steering column for motor vehicles, made of wound fiber-reinforced materials so that its bending stiffness and compressive strength are substantially reduced without compromising its torsional loading capacity or strength and without making the manufacture more difficult or more expensive;

to construct the tubular member so that it has at least one zone or section which is relatively soft against bending or axial stress to thereby avoid or minimize the chances of injury to a driver when a vehicle equipped with a steering column in the form of such a tubular member is involved in an accident; and to locate nodal or crossing junction points of fibers or fiber strands forming a zone or section of low bending and low buckling strength in a tubular member in such positions that the strength for transmitting torque moments is substantially undiminished compared to a member without such a zone or section, while said bending and buckling strengths are substantially reduced.

SUMMARY OF THE INVENTION

According to the invention the wall of a tubular member made of fiber-reinforced material with a winding angle of approximately or essentially ±45° is additionally provided with an expanded or outwardly bulging section.

Such outwardly bulging section substantially reduces the buckling or bending strength without negatively influencing the torsional strength of the tubular member. This effect of the outwardly bulging section is due to the fact that the tubular wall elements in the outwardly bulging section are subjected individually to bending forces when the tubular member is subjected to bending or compressive stress. That is, the geometry of the tubular member as a whole is not the determining factor for the compressive strength nor for the bending rigidity or strength. Rather, it is the thickness of the walls of the tubular member in its relationship to the tubular diameter which is relevant to the individual rigidities. Thus, the ratio of wall thickness to diameter, which in a rough approximation enters with the third power, provides a respective ratio of the individual rigidities or strengths. Accordingly, very small bending and longitudinal rigidity or strength values may be achieved by these means. The smallest of these values are limited only by circumferential tensions resulting from a deformation of the uppermost region of the expanded or bulging section. These tensions counteract the deformability.

In the manufacture of these tubular members, the fibers or fiber belts or strands are wound at a winding angle of essentially ±45°, whereby this winding arrangement is also maintained in the region of the expanded or outwardly bulging section without interruption. Optimal characteristics regarding the torsional strength and rigidity and regarding the low buckling and bending strengths can be achieved by this winding arrangement and these features are not achievable in metal tubular members, for example. In particular, even the circumferential tensions are smaller in the curved or outwardly bulging winding arrangement than in, for example, metal tubular members because the effective forces act at an angle of ±45° to the direction of the reinforcing fibers. However, with regard to this circumferential loading direction, as compared to other loading directions, the laminate resulting from the curved or outwardly bulging winding arrangements, has a very small or minimal rigidity stiffness. See for example, Hardbuch "Faserverbund-Leichtbau", Worksheet (Arbeitsblatt) VB 22300-05, page 3.

The mechanical characteristics of a fiber-reinforced tubular member according to the invention with an expanded or outwardly bulging section having an approximately constant winding angle of essentially ±45° may be further emphasized if an open lattice or webbing structure of fiber belts, for example, is used instead of a closed, solid-walled tubular member. Such open webbing is especially effective for the intended purpose in the region of the expanded or outwardly bulging section. Here again, the individual fiber belts or strands are individually subject to compression stress and tension stress when the tubular member is subject to torsional loads. The junctions or nodal points between the individual fiber belts should each be located at the points of greatest deflection or bending in the region of the expanded or outwardly bulging section. In this way, the bearing capacity or strength characteristics of the tubular member during torsional loading is the same in the region of the expanded or outwardly bulging section as in the region of the constant or uniform diameter. The tensions occurring in the circumferential direction are even lower in the lattice structure, at least in the region of the expanded or outwardly bulging section, than in a solid wall construction, so that a stiffening effect due to this construction is almost completely eliminated. It follows that the modulus of elasticity in the circumferential direction can be made even smaller by the lattice structure so that the tubular structure becomes altogether "softer" in the region of the lattice or webbing structure.

An outwardly bulging section in the form approximately of a double cone formed as a lattice structure has been found to be especially advantageous whereby the two base surfaces of the cones butt against each other. However, asymmetrical outwardly bulging sections or cone-shaped expanded sections from one tube diameter to a second tube diameter are also possible.

BRIEF FIGURE DESCRIPTION

Figure 2:
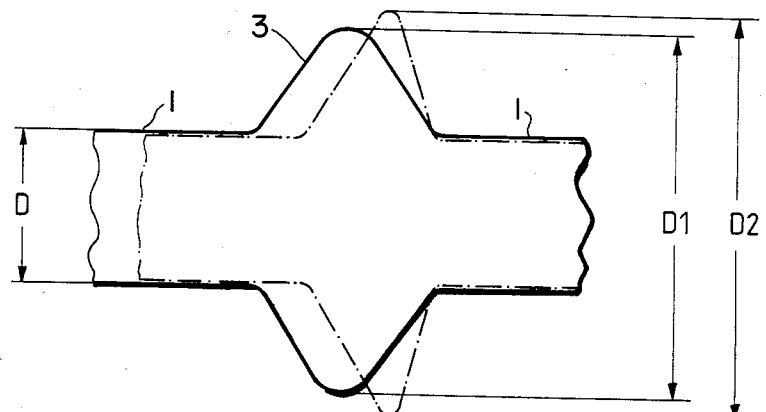

In order that the invention may be clearly understood, it will now be described, by way of example, with reference to the accompanying drawings, wherein:

FIG. 1 is a perspective view of the front half of a tubular member according to the invention with an outwardly bulging section for lowering the compression and bending or buckling rigidity or strength; and FIG. 2 shows a schematic view of the tubular member shown in FIG. 1 under normal and buckled conditions;

DETAILED DESCRIPTION OF PREFERRED EXAMPLE EMBODIMENTS AND OF THE BEST MODE OF THE INVENTION

FIG. 1 shows the front half of a part of a tubular member 1 for a safety steering column. The tubular member is wound of fiber-reinforced material in the form of fiber strand belts 2 whereby the winding angle over the length of the tubular member or relative to the longitudinal axis of the tubular member corresponds essentially to ±45°. The tubular member 1 has a diameter D and according to the invention it is provided with an outwardly bulging section 3 in the form of two conical frustums 3a and 3b butting against each other at their base surfaces. The winding of the fiber strand belts 2 is continued homogeneously in the bulging section 3. The winding of relatively wide fiber strand belts 2 in several layers results in a structure with a substantially solid tube wall in the regions of constant tube diameter D, whereas a lattice or webbing or netting structure results in the region of the outwardly bulging section 3 without any change in the winding operation. The tube diameter D is, for example 44 mm and the diameter D1 of the outwardly bulging section is 64 mm, as shown in FIG. 2 when the section 3 is not buckling.

It is desirable to control the winding operation so that the crossing or nodal points or joints P of the fiber strand belts 2 lie on each of the circumferences U1 and U2 at the transition between the tubular diameters D and the outwardly bulging section 3 and on the circumference U3 with the largest diameter D1. This has the advantage that the joints or junctions P are located where the largest bending is present where the joints P are most effective for the above stated purpose.

FIG. 2 shows the tubular member 1 under normal conditions in solid lines and under axially buckled conditions in dash-dotted lines. Normally, the bulging section 3 has a diameter D1, but during buckling, the tubular member 1 is deformed in the region of the outwardly bulging section 3 and assumes a larger diameter D2. The web lattice or netting of the outwardly bulging section 3 breaks at the nodal points or joints P and along the fiber strand belts themselves during the deformation.

A tubular member as described above was wound by using a Roving EC 9/756 tex K 43 HF in an eight-fold pattern having six layers with a binding or embedding resin CY 209/HI 972. The tubular member had a diameter D of 44 mm that increased to 64 mm in the region of the double cone outwardly bulging section 3. The web lattice broke under a force of 1780 N.

Furthermore, two test samples were wound of a Roving EC 10/156 tex in an eight-fold pattern in six layers with a binding resin CY 209/972. One test sample was a lattice tube with a constant diameter, the other test sample was a lattice tube with an outwardly bulging section according to the invention. The tubular members were compression loaded with the result that the cylindrical test sample broke under a force of 260 N and the test sample with the outwardly bulging section 3 broke under 108 N. That indicates that this second test sample according to the invention is "softer" because of the outwardly bulging section. The torsional loading capacity is the same in both test samples.

Although the invention has been described with reference to specific example embodiments, it will be appreciated that it is intended to cover all modifications and equivalents within the scope of the appended claims.

What is claimed is:

1. A tubular member having a longitudinal axis, especially for a safety steering column for motor vehicles, made of wound fiber-reinforced material strands with a fiber winding angle of essentially ±45° to said longitudinal axis for transmitting a defined torque load and a defined axial load through said tubular member, comprising at least one outwardly bulging section (3) intermediate end portions of said tubular member (1), said outwardly bulging section (3) having a diameter larger than a diameter of said end portions and extending around the entire circumference of the tubular member (1), said outwardly bulging section comprising fiber strands also wound at a winding angle of ±45° relative to said longitudinal axis and so that a spacing between neighboring crossing junctions of fiber strands increases from said diameter of said end portions to said larger diameter, and wherein said fiber strands form said crossing junctions (P) at least where said outwardly bulging section (3) has its largest diameter and where said outwardly bulging section (3) merges into said tubular member, namely at circumferential sites (U1, U2, U3) of largest bending in said fibers.

2. The tubular member of claim 1, wherein said tubular member (1) has a given diameter outside said outwardly bulging section, said given diameter being essentially the same diameter on both sides of said outwardly bulging section (3).

3. The tubular member of claim 1, wherein said tubular member (1) comprises a lattice structure of wound fiber strand belts (2) at least in the region of said outwardly bulging section (3).

4. The tubular member of claim 1, wherein said outwardly bulging section (3) comprises a shape approximating two conical frustums having base surfaces butting against each other.

* * * * *